US012244054B2

United States Patent
Choi et al.

(10) Patent No.: US 12,244,054 B2
(45) Date of Patent: Mar. 4, 2025

(54) ANTENNA PACKAGE AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Ho Dong Yoon, Gyeonggi-do (KR); Jae Hyun Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 220 days.

(21) Appl. No.: 17/903,133

(22) Filed: Sep. 6, 2022

(65) Prior Publication Data

US 2022/0416403 A1    Dec. 29, 2022

Related U.S. Application Data

(63) Continuation of application No. PCT/KR2021/002614, filed on Mar. 3, 2021.

(30) Foreign Application Priority Data

Mar. 5, 2020   (KR) .................. 10-2020-0027800

(51) Int. Cl.
*H01Q 1/22* (2006.01)
*H01Q 1/38* (2006.01)

(52) U.S. Cl.
CPC ............ *H01Q 1/2283* (2013.01); *H01Q 1/38* (2013.01)

(58) Field of Classification Search
CPC .............................. H01Q 1/2283; H01Q 1/38
See application file for complete search history.

(56) References Cited

U.S. PATENT DOCUMENTS

| 2019/0220123 A1* | 7/2019 | Kanaya | ................. H10K 59/40 |
| 2021/0096684 A1* | 4/2021 | Cheng | .................... G06F 3/044 |

FOREIGN PATENT DOCUMENTS

| CN | 103309495 A | 9/2013 |
| CN | 110034161 A | 7/2019 |
| CN | 110767613 A | 2/2020 |
| CN | 113360018 A | 9/2021 |
| KR | 10-2013-0095451 A | 8/2013 |
| KR | 10-2014-0100822 A | 8/2014 |
| KR | 10-2019-0005354 A | 1/2019 |
| KR | 10-2019-0008041 A | 1/2019 |

(Continued)

OTHER PUBLICATIONS

International Search Report for PCT/KR2021/002614 mailed on Jun. 9, 2021.

(Continued)

*Primary Examiner* — Dieu Hien T Duong
(74) *Attorney, Agent, or Firm* — The PL Law Group, PLLC

(57) ABSTRACT

An antenna package according to an exemplary embodiment includes an antenna unit, a printed circuit board including an antenna connection wiring electrically connected to the antenna unit, an antenna driving integrated circuit (IC) chip mounted on the printed circuit board and connected to the antenna connection wiring, and a touch sensor driving IC chip and a display driving IC chip mounted on the printed circuit board together with the antenna driving IC chip. The driving IC chips are integrated in a single printed circuit board to improve spatial and process efficiency.

16 Claims, 5 Drawing Sheets

(56) References Cited

FOREIGN PATENT DOCUMENTS

| | | |
|---|---|---|
| KR | 10-1962819 B1 | 3/2019 |
| KR | 10-2019-0108464 A | 9/2019 |
| KR | 10-2020-0012440 A | 2/2020 |
| WO | WO 2013/063176 A1 | 5/2013 |
| WO | WO-2017146407 A1 * | 8/2017 ............. G06F 3/041 |

OTHER PUBLICATIONS

Office action issued on Nov. 30, 2024 from China Patent Office in a counterpart China Patent Application No. 202110240158.6 (all the cited references are listed in this IDS.) (English translation is also submitted herewith.).

* cited by examiner

ANTENNA PACKAGE AND IMAGE DISPLAY DEVICE INCLUDING THE SAME

CROSS-REFERENCE TO RELATED APPLICATION AND CLAIM OF PRIORITY

The present application is a continuation of application International Application No. PCT/KR2021/002614 with an International Filing Date of Mar. 3, 2021, which claims the benefit of Korean Patent Application No. 10-2020-0027800 filed on Mar. 5, 2020 at the Korean Intellectual Property Office (KIPO), the disclosures of which are incorporated by reference herein in their entirety.

BACKGROUND

1. Field

The present invention relates to an antenna package and an image display device including the same. More particularly, the present invention relates to an antenna package including an antenna device and a driving integrated circuit chip and an image display device including the same.

2. Description of the Related Art

Recently, electronic devices capable of inputting a user's direction by selecting an instruction displayed on an image display device with a human hand or an object are implemented by a combination of the image display device and a touch sensor as various shapes such as a smart phones, a tablet PC, etc.

Further, the image display device is being combined with a communication device such as a smart phone. For example, an antenna for implementing high-frequency or ultra-high frequency communication in 3G to 5G or higher bands may be applied to the image display device.

Additionally, an intermediate circuit structure such as a flexible printed circuit board (FPCB) is employed to electrically connect the antenna and a driving integrated circuit chip for an antenna feeding/driving control.

When a touch sensor is included in the image display device, an integrated circuit chip for driving the touch sensor and a separate FPCB are used. Further, an integrated circuit chip for a display driving of an image display device is also mounted, and an additional circuit connection structure is required.

Recently, as a space for a bezel portion or a light-shielding portion of the image display device is reduced, a space for circuit members such as an intermediate circuit structure, a circuit connection structure and an integrated circuit chip is also decreased. Thus, developments of a method for efficiently implementing a circuit connection while preventing a mutual signal interference between the antenna and the touch sensor are needed.

For example, as disclosed in Korean Published Patent Application No. 2014-0092366, a touch screen panel in which a touch sensor is combined with various image display devices has been recently developed. Korean Patent Publication No. 2013-0095451 discloses an antenna integrated into a display panel. However, an image display device in which the antenna and the touch sensor are efficiently arranged while maintaining driving reliability thereof is not suggested.

SUMMARY

According to an aspect of the present invention, there is provided an antenna package having improved operational reliability and spatial efficiency.

According to an aspect of the present invention, there is provided an image display device including an antenna package with improved operational reliability and spatial efficiency.

The above aspects of the present invention will be achieved by one or more of the following features or constructions:

(1) An antenna package, including: an antenna unit; a printed circuit board including an antenna connection wiring electrically connected to the antenna unit; an antenna driving integrated circuit (IC) chip mounted on the printed circuit board and connected to the antenna connection wiring; and a touch sensor driving IC chip and a display driving IC chip mounted on the printed circuit board together with the antenna driving IC chip (2) The antenna package according to the above (1), wherein the printed circuit board further includes a touch sensor connection wiring connected to the touch sensor driving IC chip and a display circuit connection wiring connected to the display driving IC chip.

(3) The antenna package according to the above (2), further including a first guard pattern disposed on the printed circuit board and disposed between the antenna driving IC chip and the touch sensor driving IC chip in a planar view.

(4) The antenna package according to the above (3), wherein the first guard pattern surrounds the antenna driving IC chip.

(5) The antenna package according to the above (3), further including a second guard pattern disposed on the printed circuit board and disposed between the touch sensor driving IC chip and the display driving IC chip in the planar view.

(6) The antenna package according to the above (3), further including a second guard pattern disposed on the printed circuit board and disposed between the touch sensor connection wiring and the display circuit connection wiring in the planar view.

(7) The antenna package according to the above (2), wherein end portions of the antenna connection wiring, the touch sensor connection wiring and the display circuit connection wiring are distributed together at one end portion of the printed circuit board.

(8) The antenna package according to the above (7), wherein the one end portion of the printed circuit board includes a bonding tag including at least one of an end portion of the antenna connection wiring, an end portion of the touch sensor connection wiring and an end portion of the display circuit connection wiring.

(9) The antenna package according to the above (8), wherein the bonding tag includes an antenna bonding tag including the end portion of the antenna connection wiring, a touch sensor bonding tag including the end portion of the touch sensor connection wiring, and a display bonding tag including the end portion of the display circuit connection wiring.

(10) The antenna package according to the above (1), wherein the touch sensor driving IC chip and the display driving IC chip are integrated into a single chip.

(11) The antenna package according to the above (1), further including: a substrate layer; and
a touch sensor electrode structure disposed on the substrate layer.

(12) The antenna package according to the above (11), wherein the antenna unit is disposed on the substrate layer together with the touch sensor electrode structure.

(13) The antenna package according to the above (11), further including a dielectric layer disposed on the touch sensor electrode structure, wherein the antenna unit is disposed on the dielectric layer.

(14) The antenna package according to the above (11), wherein the touch sensor electrode structure includes sensing electrodes and traces extending from the sensing electrodes, and the antenna unit includes a radiator, a transmission line extending from the radiator and a signal pad connected to an end portion of the transmission line.

(15) The antenna package according to the above (14), wherein the substrate layer includes an active region and a bonding region adjacent to the active region at an end portion of the substrate layer, wherein the radiator and the sensing electrodes are disposed in the active region a planar view, and the signal pad and end portions of the traces are distributed together in the bonding region in the planar view.

(16) An image display device, including: a display panel; and the antenna package according to the embodiments as described above.

In an antenna package according to exemplary embodiments of the present invention, an antenna driving integrated circuit (IC) chip, a touch sensor driving IC chip and a display driving IC chip may be mounted together on a single printed circuit board such as a flexible printed circuit board (FPCB). Thus, driving circuits may be integrated without connecting an independent FPCB for each of an antenna and a touch sensor to improve process and spatial efficiency.

In some embodiments, the antenna package may include a guard pattern for dividing each driving IC chip. Accordingly, an interference between driving IC chips may be prevented while maintaining a driving independence on a single printed circuit board.

In some embodiments, the printed circuit board may include bonding tags for connections to an antenna, a touch sensor and a display panel. A bonding convenience with the antenna, the touch sensor and the display panel may be enhanced using the bonding tags and a signal loss may be reduced by shortening a bonding length.

DETAILED DESCRIPTION OF THE EMBODIMENTS

According to exemplary embodiments of the present invention, there is provided an antenna package including an antenna driving integrated circuit chip, a touch sensor driving integrated circuit chip and a display driving integrated circuit chip disposed on one intermediate circuit structure is provided. Further, an image display device including the antenna package is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
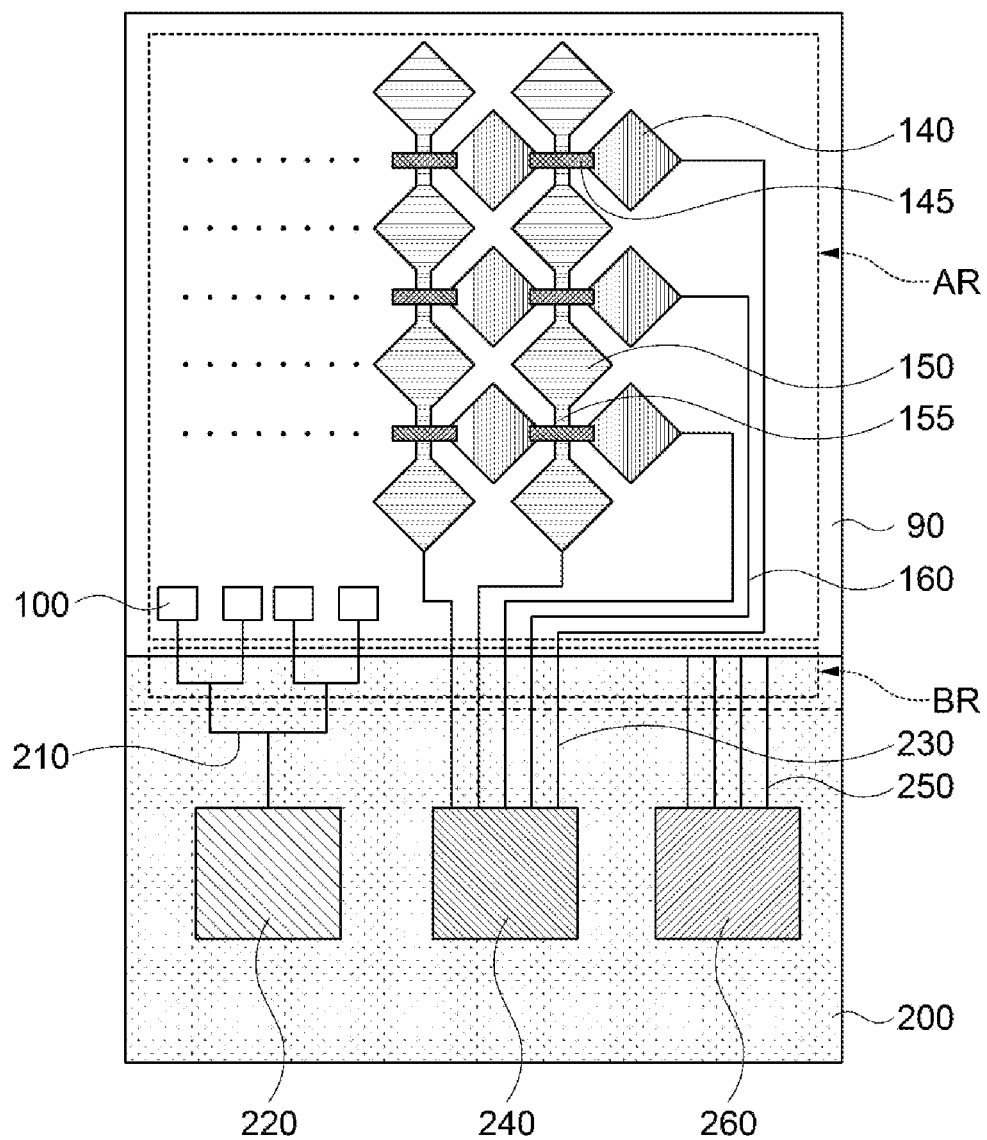
FIG. 1 is a schematic top planar view illustrating an antenna package in accordance with exemplary embodiments.

FIG. 1 is a schematic top planar view illustrating an antenna package in accordance with exemplary embodiments.

Referring to FIG. 1, the antenna package may include a printed circuit board 200, and an antenna driving integrated circuit (IC) chip 220, a touch sensor driving IC chip 240 and a display driving IC chip 260 mounted on the printed circuit board 200.

The printed circuit board 200 may be, e.g., a flexible printed circuit board (FPCB). For example, the printed circuit board 200 may include a core layer and wirings formed in the core layer or on bottom and top surfaces of the core layer.

The core layer may include, e.g., a flexible resin such as a polyimide resin, Modified Polyimide (MPI), an epoxy resin, polyester, a cycloolefin polymer (COP), a liquid crystal polymer (LCP), or the like.

The wirings may include an antenna connection wiring 210, a touch sensor connection wiring 230 and a display circuit connection wiring 250.

In exemplary embodiments, the antenna driving integrated circuit (IC) chip 220, the touch sensor driving IC chip 240 and the display driving IC chip 260 may be mounted together on the top surface of the printed circuit board 200. For example, the antenna driving integrated circuit (IC) chip 220, the touch sensor driving IC chip 240, and the display driving IC chip 260 may be directly mounted on the top surface of the printed circuit board 200 by a surface mount technology (SMT).

For example, the antenna driving integrated circuit (IC) chip 220, the touch sensor driving IC chip 240 and the display driving IC chip 260 may be electrically connected to the antenna connection wiring 210, the touch sensor connection wiring 230 and the display circuit connection wiring 250, respectively, through a circuit intermediate structure such as a ball grid array (BGA), vias, contacts, etc.

The antenna driving integrated circuit (IC) chip 220 and the touch sensor driving IC chip 240 may be electrically connected to an antenna unit 100 and a touch sensor electrode structure, respectively, to perform a feeding and/or a driving control.

The antenna unit 100 and the touch sensor electrode structure may be disposed on a substrate layer 90. The substrate layer 90 may include an active region AR and a bonding region BR. The active region AR may be an area in which a touch sensing and an antenna radiation may be substantially implemented. The active region AR may correspond to a display area of the image display device.

The substrate layer 90 may include a support layer or a film type substrate for forming sensing electrodes 140 and 150 and the antenna unit 150. For example, the substrate layer 90 may include a film material commonly used for a touch sensor without particular limitation, and may include, e.g., glass, a polymer, and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride and a metal oxide.

In some embodiments, a layer or film member of an image display device may serve as the substrate layer 90. For example, an encapsulation layer or a passivation layer included in a display panel may serve as the substrate layer 90.

The substrate layer 90 may serve as a dielectric layer of the antenna unit 100. Preferably, a dielectric constant of the substrate layer 90 may be adjusted in a range from about 1.5 to 12. When the dielectric constant exceeds about 12, a driving frequency may be excessively decreased and an antenna driving in a desired high frequency or ultrahigh frequency band may not be implemented.

In some embodiments, the touch sensor electrode structure may include the sensing electrodes 140 and 150 arranged according to, e.g., a mutual capacitance-type. For example, the sensing electrodes 140 and 150 may include first sensing electrodes 140 and second sensing electrodes 150.

The first sensing electrodes 140 may be arranged along a row direction (e.g., an X-direction or a width direction). Each of the first sensing electrodes 140 may have an independent island pattern, and the first sensing electrodes 140 neighboring in the row direction may be electrically connected to each other by a bridge electrode 145. Accordingly, a first sensing electrode row extending in the row direction may be defined, and a plurality of the first sensing electrode rows may be arranged along a column direction.

For example, an insulating layer (not illustrated) covering the sensing electrodes 140 and 150 may be formed on the substrate layer 90. The bridge electrode 145 may be formed on the insulating layer, and may electrically connect the first sensing electrodes 140 neighboring in the row direction through contact holes formed in the insulating layer.

The second sensing electrodes 150 may be arranged along a column direction (e.g., a Y-direction or a length direction). The second sensing electrodes 150 adjacent to each other in the column direction may be connected to each other by a connector 155. The second sensing electrodes 150 and the connector 155 may be integrally connected to each other to be substantially provided as a single member. In this case, the second sensing electrodes 150 and the connector 155 may be formed by patterning the same conductive layer, and may be located at the same layer or at the same level.

Accordingly, a second sensing electrode column extending in the column direction may be defined, and a plurality of the second sensing electrode columns may be arranged along the row direction.

FIG. 1 illustrates that the first sensing electrode row includes the bridge electrode 145 and the second sensing electrode column includes the connector 155. However, in an embodiment, the second sensing electrode column may be defined by the bridge electrode, and the first sensing electrode row may be defined by the connector.

The sensing electrodes 140 and 150 and/or the bridge electrode 145 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), tin (Sn), calcium (Ca) or an alloy containing at least one of the metals. These may be used alone or in combination thereof.

In an embodiment, the sensing electrodes 140 and 150 and/or the bridge electrode 145 may include silver (Ag) or a silver alloy (e.g., a silver-palladium-copper (APC) alloy) to implement a low resistance. In an embodiment, the sensing electrodes 140 and 150 and/or the bridge electrode 145 may include copper (Cu) or a copper alloy (e.g., a copper-calcium (CuCa) alloy) in consideration of a low resistance and a fine line width patterning.

The sensing electrodes 140 and 150 and/or the bridge electrode 145 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 140 and 150 and/or the bridge electrode 145 may have a multi-layered structure including a metal layer and a transparent metal oxide layer. For example, the sensing electrodes 140 and 150 and/or the bridge electrode 145 may include a double-layered structure of a transparent conductive oxide layer-metal layer or a triple-layered structure of a first transparent conductive oxide layer-metal layer-second transparent conductive oxide layer. In this case, flexible properties may be improved by the metal layer, and a resistance may also be reduced by the metal layer to increase a signal transmission speed. Anti-corrosive and transparent properties may be improved by the transparent conductive oxide layer.

A trace 160 may extend from each of the above-described first sensing electrode row and second sensing electrode column. End portions of the traces 160 may be collected on the bonding region BR of the substrate layer 90. Accordingly, one end of the printed circuit board 200 may be bonded to the bonding region BR so that the end portions of the traces 160 may be electrically connected to the touch sensor connection wiring 230.

The antenna units 100 may be arranged on a portion of the active region AR of the substrate layer 90 adjacent to the bonding region BR so as not to overlap or cross the traces 160. Accordingly, the antenna connection wiring 210 and the antenna unit 100 may be electrically connected through a short signal path without a circuit bypass, thereby preventing a signal loss.

Structures and elements of the antenna unit 100 will be described later in more detail with reference to FIG. 2.

In some embodiments, a conductive intermediate structure such as an anisotropic conductive film (ACF) may be formed between the bonding region BR of the substrate layer 90 and one end portion of the printed circuit board 200. For example, the anisotropic conductive film may be formed on signal pads of the antenna unit 100 and the end portions of the traces 160, and then the one end portion of the printed circuit board 200 may be thermally compressed onto the bonding region BR of the substrate layer 90 so that the anisotropic conductive film, the antenna connection wiring 210 and the touch sensor connection wiring 230 may contact each other.

A display panel may be disposed under the substrate layer 90. The display panel may include a panel substrate and a pixel circuit disposed on the panel substrate. The pixel circuit may include a pixel electrode, an opposing electrode, a thin film transistor (TFT), a scan line, a data line, a power line, or the like.

The display circuit connection wiring 250 may be electrically connected to the pixel circuit, and thus an image display driving may be controlled through the display driving IC chip 260.

According to the above-described exemplary embodiments, the antenna driving integrated circuit (IC) chip 220, the touch sensor driving IC chip 240 and the display driving IC chip 260 may be mounted on one printed circuit board 200. Accordingly, an increase in a process complexity and a space for circuit arrangement caused when IC chips for each of an antenna, a touch sensor and a display are mounted using, e.g., a plurality of FPCBs or circuit connectors may be suppressed.

Figure 2:
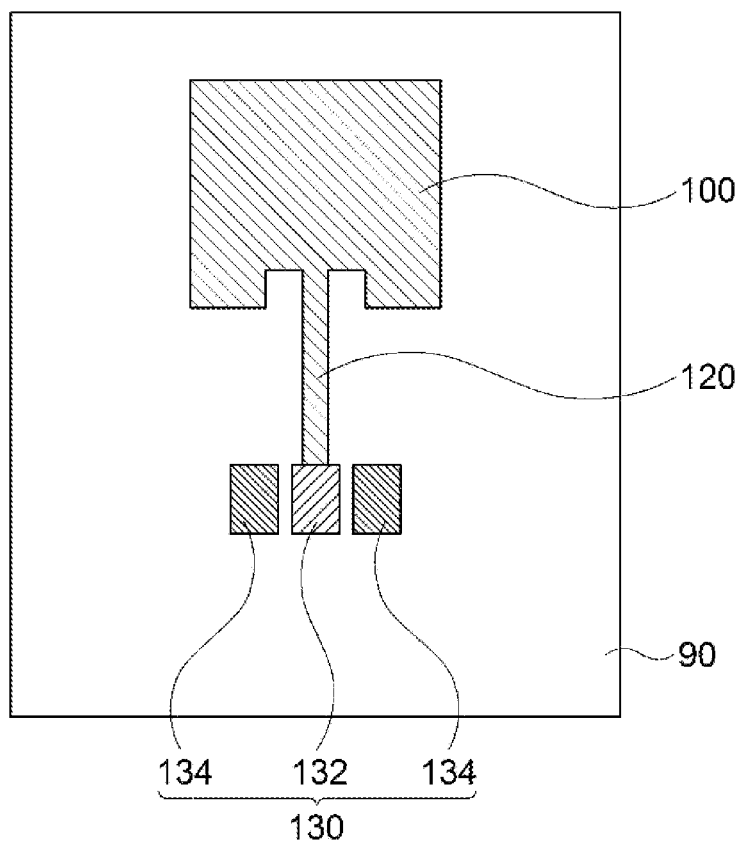
FIG. 2 is a schematic top planar view illustrating an antenna unit included in an antenna package in accordance with exemplary embodiments.

FIG. 2 is a schematic top planar view illustrating an antenna unit included in an antenna package in accordance with exemplary embodiments.

Referring to FIG. 2, the antenna unit 100 may include a radiator 110, a transmission line 120 and a pad 130 formed on the substrate layer 90.

The radiator 110 may have, e.g., a polygonal plate shape, and the transmission line 120 may extend from one side of the radiator 110 to be electrically connected to a signal pad 132. The transmission line 120 may be formed as a single member substantially integral with the radiator 110.

In some embodiments, the pad 130 may include the signal pad 132 and may further include a ground pad 134. For example, a pair of the ground pads 134 may be disposed with the signal pad 132 interposed therebetween. The ground pads 134 may be electrically separated from the signal pad 132 and the transmission line 120.

In an embodiment, the ground pad 134 may be omitted. Further, the signal pad 132 may be provided as an integral member with an end of the transmission line 120.

The signal pad 132 may be disposed on the bonding region BR of the substrate layer 90 and may be electrically connected to the antenna driving IC chip 220 through the antenna connection wiring 210 included in the printed circuit board 200. Accordingly, the feeding and the driving control to the radiator 110 may be performed through the antenna driving IC chip 220.

The radiator 110 may be disposed on the active region AR of the substrate layer 90 together with the sensing electrodes 140 and 150. The transmission line 120 may extend over the active region AR and the bonding region BR, and may connect the radiator 110 and the signal pad 132 to each other.

The antenna unit 100 may include a conductive material substantially the same as or similar to that of the sensing electrodes 140 and 150. For example, the antenna unit 100 may include a metal, a transparent conductive oxide or a multi-layered structure of a metal layer-transparent conductive oxide layer.

Figure 3:
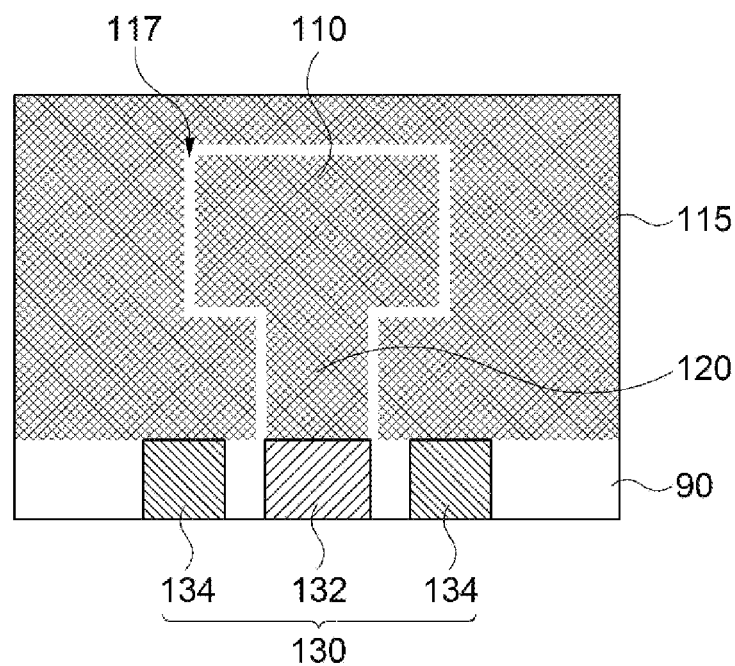
FIG. 3 is a schematic top planar view illustrating an antenna unit included in an antenna package in accordance with some exemplary embodiments.

FIG. 3 is a schematic top planar view illustrating an antenna unit included in an antenna package in accordance with some exemplary embodiments.

Referring to FIG. 3, the radiator 110 may have a mesh structure. In some embodiments, the transmission line 120 connected to the radiator 110 may also have a mesh structure.

The radiator 110 may include the mesh structure, so that transmittance may be improved even when the radiator 110 is disposed in the display area or the active region AR of the image display device, thereby preventing a visual recognition of electrodes and a deterioration of an image quality.

A dummy mesh pattern 115 may be disposed around the radiator 110 and the transmission line 120. The dummy mesh pattern 115 may be electrically and physically separated from the radiator 110 and the transmission line 120 by a separation region 117.

For example, a conductive layer may be formed on the substrate layer 90. Thereafter, the conductive layer may be partially etched along a profile of the radiator 110 and the transmission line 120 to form the separation region 117 while forming the mesh structure by etching the conductive layer. Accordingly, a portion of the conductive layer may be converted into the dummy mesh pattern 115.

In some embodiments, the pad 130 may be formed as a solid structure to reduce a feeding resistance. As described above, the pad 130 may be disposed in the non-display area or the bonding region BR of the image display device. Accordingly, the pad 130 may be disposed at an outside of a user's viewing area.

In some embodiments, the sensing electrodes 140 and 150 of the touch sensor electrode structure may also be formed from the conductive layer together with the radiator 110 and the transmission line 120. In this case, the dummy mesh pattern 115 may also be distributed between the sensing electrodes 140 and 150. Accordingly, uniformity of distribution of an electrode pattern on the active region AR may be improved, and thus the electrode visual recognition may be suppressed.

Figure 4:
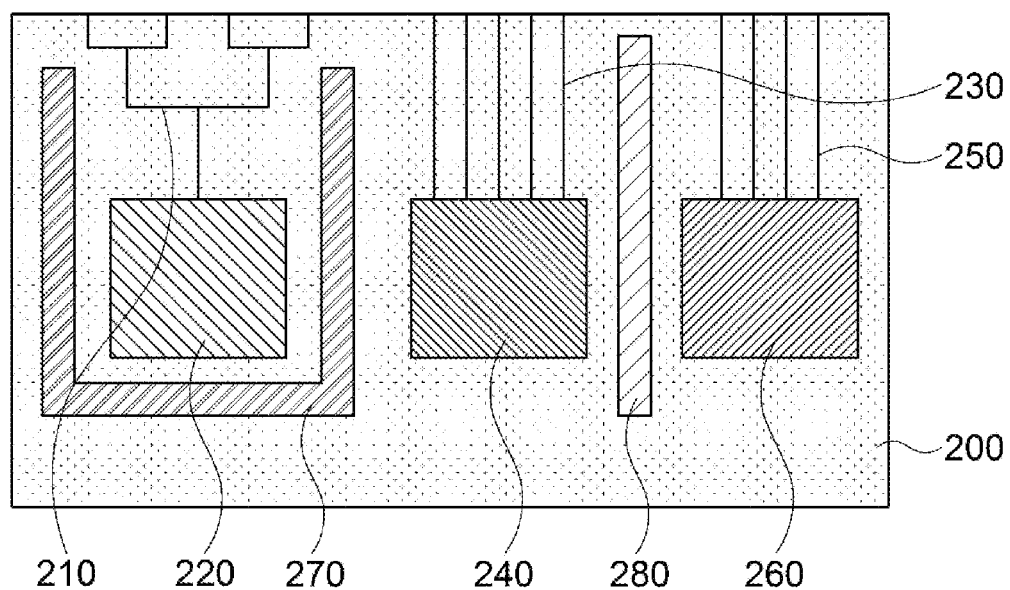
FIG. 4 is a schematic top planar view illustrating an antenna package in accordance with some exemplary embodiments.

FIG. 4 is a schematic top planar view illustrating an antenna package in accordance with some exemplary embodiments. Detailed descriptions of elements and/or structures substantially the same as or similar to those described with reference to FIG. 1 are omitted.

Referring to FIG. 4, the printed circuit board 200 may include guard patterns 270 and 280 disposed between the driving IC chips 220, 240 and 260 in a planar view.

The guard patterns 270 and 280 may include a first guard pattern 270 disposed between the antenna driving IC chip 220 and the touch sensor driving IC chip 240, and a second guard pattern 280 disposed between the touch sensor driving IC chip 240 and the display driving IC the chip 260.

The guard patterns 270 and 280 may serve as ground patterns for shielding a signal interference or a noise between the antenna driving IC chip 220, the touch sensor driving IC chip 240 and the display driving IC chip 260. Thus, even though the antenna driving IC chip 220, the touch sensor driving IC chip 240 and the display driving IC chip 260 are integrated in one printed circuit board 200, a circuit connection may be implemented while maintaining a mutual driving independence.

In some embodiments, the first guard pattern 270 may substantially surround the antenna driving IC chip 220 in a planar view. For example, the first guard pattern 270 may extend to be adjacent to two or more sidewalls of the antenna driving IC chip 220 and may include a bent portion.

The guard patterns 270 and 280 may include the above-described metal and/or alloy.

Figure 5:
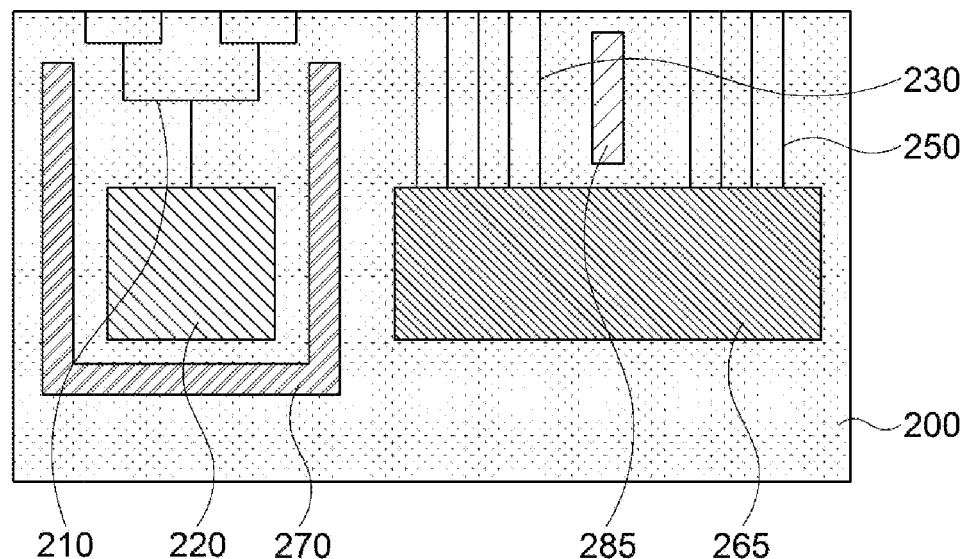
FIG. 5 is a schematic top planar view illustrating an antenna package in accordance with some exemplary embodiments.

FIG. 5 is a schematic top planar view illustrating an antenna package in accordance with some exemplary embodiments.

Referring to FIG. 5, the touch sensor driving IC chip 240 and the display driving IC chip 260 described with reference to FIG. 1 may be integrated into one IC chip. Accordingly, a touch sensor-display driving IC chip 265 may be mounted on the printed circuit board 200. In this case, the touch sensor connection wiring 230 and the display circuit connection wiring 250 may be connected to the touch sensor-display driving IC chip 265.

In some embodiments, a second guard pattern 285 may be disposed between the touch sensor connection wiring 230 and the display circuit connection wiring 250 in the planar view. Accordingly, a mutual signal interference due to a generation of a touch sensor driving signal and a display driving signal from one touch sensor-display driving IC chip 265 may be effectively prevented.

Figure 6:
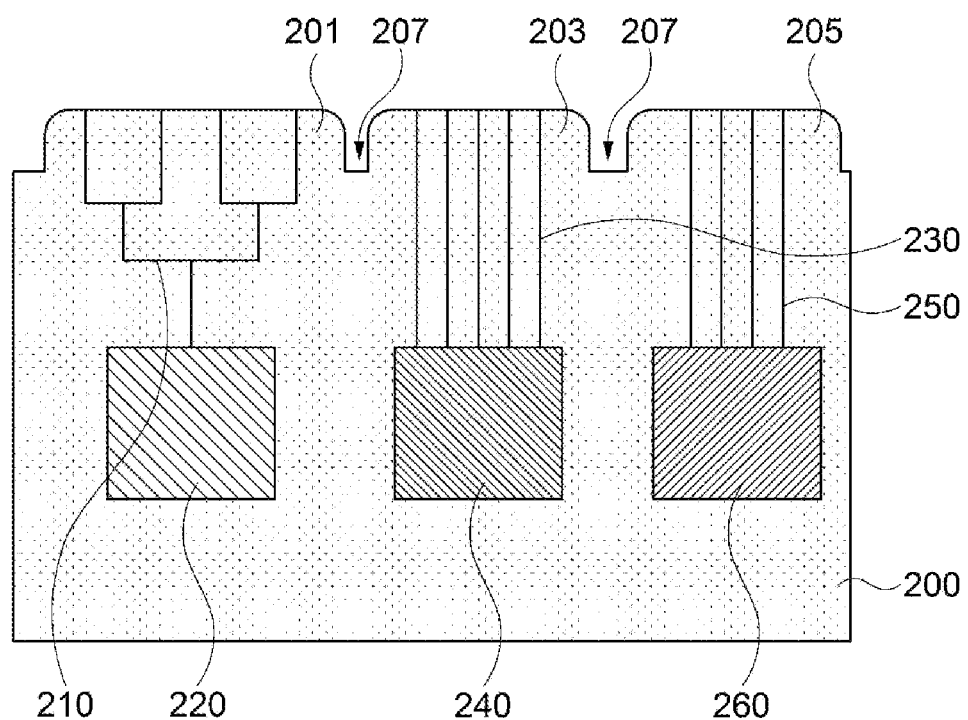
FIG. 6 is a schematic top planar view illustrating an antenna package in accordance with some exemplary embodiments.

FIG. 6 is a schematic top planar view illustrating an antenna package in accordance with some exemplary embodiments.

Referring to FIG. 6, bonding tags may be formed at one end portion of the printed circuit board 200. For example, the bonding tags may include an antenna bonding tag 201, a touch sensor bonding tag 203 and a display bonding tag 205.

In exemplary embodiments, grooves 207 may be formed at the one end portion of the printed circuit board 200 to divide the antenna bonding tag 201, the touch sensor bonding tag 203 and the display bonding tag 205. The antenna bonding tag 201 may include an end portion of the antenna connection wiring 210. The touch sensor bonding tag 203 may include an end portion of the touch sensor connection wiring 230. The display bonding tag 205 may include an end portion of the display circuit connection wiring 250.

The antenna connection wiring 210, the touch sensor connection wiring 230 and the display circuit connection wiring 250 may be spatially separated by the bonding tags 201, 203 and 205. Accordingly, when a bonding process for the circuit connection is performed on the bonding region BR of the substrate layer 90, a bonding stress may be prevented from entirely propagating to the end portion of the printed circuit board 200.

Additionally, the bonding tags 201, 203 and 205 may be bent to easily perform the bonding process according to positions of the antenna unit 100, the touch sensor electrode structure and the display panel.

Figure 7:
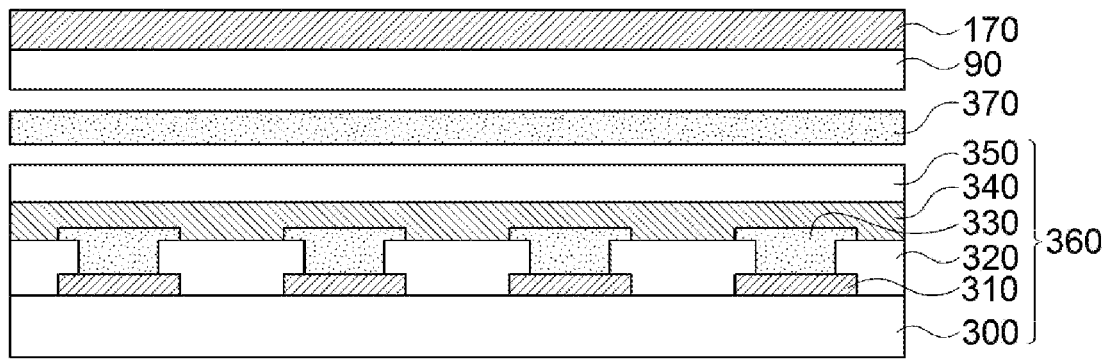
FIGS. 7 and 8 are schematic cross-sectional views illustrating an image display device including an antenna package in accordance with exemplary embodiments.
Figure 8:
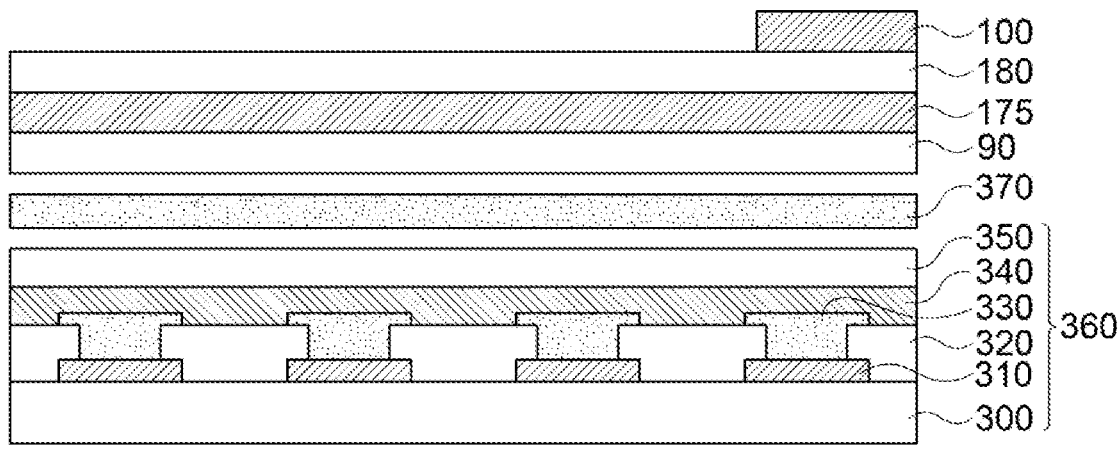

FIGS. 7 and 8 are schematic cross-sectional views illustrating an image display device including an antenna package in accordance with exemplary embodiments.

Referring to FIGS. 7 and 8, the image display device may include a display panel 360 and a substrate layer 90 stacked on the display panel 360.

The display panel 360 may include a pixel electrode 310, a pixel defining layer 320, a display layer 330, an opposing electrode 340, and an encapsulation layer 350 disposed on a panel substrate 300.

A pixel circuit including a thin film transistor TFT may be formed on the panel substrate 300, and an insulating layer may be formed to cover the pixel circuit. The pixel electrode 310 may be electrically connected to, e.g., a drain electrode of a TFT on the insulating layer.

The pixel defining layer 320 may be formed on the insulating layer to expose the pixel electrode 310 to define a pixel region. The display layer 330 may be formed on the pixel electrode 310, and the display layer 330 may include, e.g., a liquid crystal layer or an organic light-emitting layer.

The opposing electrode 340 may be disposed on the pixel defining layer 320 and the display layer 330. The opposing electrode 340 may serve as, e.g., a common electrode or a cathode of a display device. The encapsulation layer 350 for protecting the display panel 360 may be stacked on the opposing electrode 340.

The pixel electrode 310 and the opposing electrode 340 may be included as elements of the pixel circuit.

In some embodiments, the display panel 360 and the substrate layer 90 may be combined by an adhesive layer 370.

As illustrated in FIG. 7, an antenna-touch sensor electrode layer 170 may be formed on the substrate layer 90. The antenna-touch sensor electrode layer 170 may include the antenna unit 100 and the sensing electrodes 140 and 150 as illustrated in FIG. 1.

In this case, the antenna unit 100 and the sensing electrodes 140 and 150 may be included at the same layer or at the same level, and the antenna bonding tag 201 and the touch sensor bonding tag 203 as described with reference to FIG. 6 are used such that the antenna unit 100 and the sensing electrodes 140 and 150 may be connected to the printed circuit board 200 together on the bonding region BR of the substrate layer 90.

The display bonding tag 205 may be bent downwardly to be connected to the pixel circuit included in the display panel 360.

As illustrated in FIG. 8, a touch sensor electrode structure 175 may be formed on the substrate layer 90, and a dielectric layer 180 and the antenna unit 100 may be sequentially stacked on the touch sensor electrode structure 175. The touch sensor electrode structure 175 may include the sensing electrodes 140 and 150 as described above.

In this case, the antenna bonding tag 201 illustrated in FIG. 6 may be electrically connected to the antenna unit 100 on the dielectric layer 180. The touch sensor bonding tag 203 and the display bonding tag 205 may be bent downwardly to be connected to the traces 160 and the pixel circuit, respectively.

As described above, the circuit connection may be implemented using the bonding tags included in the printed circuit board 200 according to the arrangement of the antenna unit 100 and the touch sensor electrode structure 175. Accordingly, the antenna driving IC chip 220, the touch sensor driving IC chip 240 and the display driving IC chip 260 may be easily integrated on the single printed circuit board 200.

What is claimed is:

1. An antenna package, comprising:
   a substrate layer;
   an antenna unit disposed on the substrate layer;
   a touch sensor electrode structure disposed on the substrate layer, the touch sensor electrode structure comprising sensing electrodes and traces extending from the sensing electrodes;
   a printed circuit board including an antenna connection wiring electrically connected to the antenna unit;
   an antenna driving integrated circuit (IC) chip mounted on the printed circuit board and connected to the antenna connection wiring; and
   a touch sensor driving IC chip and a display driving IC chip mounted on the printed circuit board together with the antenna driving IC chip,
   wherein the antenna unit is disposed only on one end portion of the substrate layer, and the antenna unit does not overlap or cross the traces of the touch sensor electrode structure.

2. The antenna package according to claim 1, wherein the printed circuit board further comprises a touch sensor connection wiring connected to the touch sensor driving IC chip and a display circuit connection wiring connected to the display driving IC chip.

3. The antenna package according to claim 2, further comprising a first guard pattern disposed on the printed circuit board and disposed between the antenna driving IC chip and the touch sensor driving IC chip in a planar view.

4. The antenna package according to claim 3, wherein the first guard pattern surrounds the antenna driving IC chip.

5. The antenna package according to claim 3, further comprising a second guard pattern disposed on the printed circuit board and disposed between the touch sensor driving IC chip and the display driving IC chip in the planar view.

6. The antenna package according to claim 3, further comprising a second guard pattern disposed on the printed circuit board and disposed between the touch sensor connection wiring and the display circuit connection wiring in the planar view.

7. The antenna package according to claim 2, wherein end portions of the antenna connection wiring, the touch sensor connection wiring and the display circuit connection wiring are distributed together at one end portion of the printed circuit board.

8. The antenna package according to claim 7, wherein the one end portion of the printed circuit board comprises a bonding tag including at least one of an end portion of the antenna connection wiring, an end portion of the touch sensor connection wiring and an end portion of the display circuit connection wiring.

9. The antenna package according to claim 8, wherein the bonding tag comprises an antenna bonding tag including the end portion of the antenna connection wiring, a touch sensor bonding tag including the end portion of the touch sensor connection wiring, and a display bonding tag including the end portion of the display circuit connection wiring.

10. The antenna package according to claim 1, wherein the touch sensor driving IC chip and the display driving IC chip are integrated into a single chip.

11. The antenna package according to claim 1, further comprising:

a substrate layer; and
a touch sensor electrode structure disposed on the substrate layer.

12. The antenna package according to claim 11, wherein the antenna unit is disposed on the substrate layer together with the touch sensor electrode structure.

13. The antenna package according to claim 11, further comprising a dielectric layer disposed on the touch sensor electrode structure,
wherein the antenna unit is disposed on the dielectric layer.

14. The antenna package according to claim 11, wherein the touch sensor electrode structure comprises sensing electrodes and traces extending from the sensing electrodes, and
the antenna unit includes a radiator, a transmission line extending from the radiator and a signal pad connected to an end portion of the transmission line.

15. The antenna package according to claim 14, wherein the substrate layer comprises an active region and a bonding region adjacent to the active region at an end portion of the substrate layer,
wherein the radiator and the sensing electrodes are disposed in the active region a planar view, and
the signal pad and end portions of the traces are distributed together in the bonding region in the planar view.

16. An image display device, comprising:
a display panel; and
the antenna package according to claim 1.

* * * * *